(12) United States Patent
Korte (10) Patent No.: US 11,340,711 B2
(45) Date of Patent: May 24, 2022

(54) DEVICE AND METHOD FOR GENERATING MOVING LIGHT EFFECTS, AND SALESROOM HAVING SUCH A SYSTEM

(71) Applicant: VOYETRA TURTLE BEACH, INC., Valhalla, NY (US)

(72) Inventor: Rene Korte, Hamburg (DE)

(73) Assignee: Voyetra Turtle Beach, Inc., Valhalla, NY (US)

( * ) Notice: Subject to any disclaimer, the term of this patent is extended or adjusted under 35 U.S.C. 154(b) by 0 days.

(21) Appl. No.: 16/639,967

(22) PCT Filed: Aug. 22, 2018

(86) PCT No.: PCT/EP2018/072594
§ 371 (c)(1),
(2) Date: Feb. 18, 2020

(87) PCT Pub. No.: WO2019/038307
PCT Pub. Date: Feb. 28, 2019

(65) Prior Publication Data
US 2020/0201449 A1   Jun. 25, 2020

(30) Foreign Application Priority Data
Aug. 22, 2017   (DE) ..................... 10 2017 119 125.9

(51) Int. Cl.
*G06F 3/02* (2006.01)
*A63F 13/22* (2014.01)
(Continued)

(52) U.S. Cl.
CPC ............ *G06F 3/0219* (2013.01); *A63F 13/22* (2014.09); *A63F 13/26* (2014.09); *G06F 3/03543* (2013.01); *G06N 3/08* (2013.01)

(58) Field of Classification Search
CPC .... G06F 3/0219; G06F 3/03543; A63F 13/22; A63F 13/26; G06N 3/08;
(Continued)

(56) References Cited

U.S. PATENT DOCUMENTS

| 6,023,693 A * | 2/2000 | Masuoka | ................. | G06N 3/08 706/25 |
| 7,236,154 B1 * | 6/2007 | Kerr | ..................... | G09G 3/3406 345/102 |

(Continued)

FOREIGN PATENT DOCUMENTS

| DE | 202013101905 | 6/2013 |
| DE | 102015122298 | 6/2017 |

(Continued)

OTHER PUBLICATIONS

International Search Report and Written Opinion dated Dec. 4, 2018 for International Application No. PCT/EP2018/072594, filed Aug. 22, 2018.

(Continued)

*Primary Examiner* — Grant Sitta
(74) *Attorney, Agent, or Firm* — Sheppard Mullin Richter & Hampton LLP (57) ABSTRACT

The invention relates to a system (1) for generating moving light effects, having a display (2) comprising a plurality of lighting units (10a), which is designed to emit one or more temporally changing color patterns (4, 4*, 4), a peripheral device (6) comprising a lighting arrangement (9) having one or more lighting units (10b), and a control module (11) formed for actuating the lighting units (10a) of the display (2) and the one or more lighting units (10b) of the peripheral device (6). Said control module is designed to operate the one or more lighting units (10b) of the peripheral device (6) and the lighting units (10a) of the display (2) generating the color pattern (4, 4***) in one-sided or mutual dependence on
(Continued)

one another. The invention further relates to a method for generating moving light effects and to a salesroom having such a system (1).

19 Claims, 5 Drawing Sheets (51) Int. Cl.
*A63F 13/26* (2014.01)
*G06F 3/0354* (2013.01)
*G06N 3/08* (2006.01)

(58) Field of Classification Search
CPC ......... H01H 2219/039; H01H 2219/02; H01H 13/83; H04M 1/22; H04M 1/0283
See application file for complete search history.

(56) References Cited

U.S. PATENT DOCUMENTS

| | | | | |
|---|---|---|---|---|
| 7,908,237 B2* | 3/2011 | Angell | ............... | G06Q 30/0255 706/45 |
| 7,990,702 B2* | 8/2011 | Tracy | ............... | G06F 1/1669 361/679.55 |
| 8,138,687 B2* | 3/2012 | Pance | ............... | G02B 6/0076 315/294 |
| 8,355,003 B2* | 1/2013 | Pope | ............... | A63F 13/428 345/170 |
| 8,552,985 B2* | 10/2013 | Massaro | ............... | G06F 3/0202 345/168 |
| 8,856,679 B2* | 10/2014 | Sirpal | ............... | G06T 3/00 715/790 |
| 9,086,737 B2* | 7/2015 | Smith | ............... | G06F 3/0238 |
| 9,329,777 B2* | 5/2016 | Chung | ............... | G06F 3/04886 |
| 9,779,591 B2* | 10/2017 | Montero | ............... | G06F 3/0219 |
| 10,001,806 B2* | 6/2018 | Cheng | ............... | G06F 1/1616 |
| 10,884,690 B2* | 1/2021 | Komiyama | ............... | G06F 1/1677 |
| 10,888,779 B2* | 1/2021 | Rom | ............... | A63F 13/28 |
| 10,942,647 B2* | 3/2021 | Itoh | ............... | G06F 3/0233 |
| 10,956,020 B2* | 3/2021 | Teng | ............... | G06F 3/0488 |
| 11,061,559 B2* | 7/2021 | Thai | ............... | G06K 9/00288 |
| 2002/0152045 A1* | 10/2002 | Dowling | ............... | H05B 47/155 702/107 |
| 2005/0073446 A1* | 4/2005 | Lazaridis | ............... | G06F 3/0202 341/22 |
| 2006/0034042 A1* | 2/2006 | Hisano | ............... | G06F 1/1656 361/679.04 |
| 2007/0002210 A1* | 1/2007 | Ho | ............... | G09G 3/3413 349/61 |
| 2007/0019394 A1* | 1/2007 | Park | ............... | G02B 6/0021 362/23.18 |
| 2008/0001787 A1* | 1/2008 | Smith | ............... | H01H 13/83 341/23 |
| 2009/0027346 A1 | 1/2009 | Srivastava et al. | | |
| 2009/0201179 A1* | 8/2009 | Shipman | ............... | G06F 3/0202 341/22 |
| 2009/0225035 A1* | 9/2009 | Baik | ............... | G06F 3/04886 345/173 |
| 2010/0079378 A1* | 4/2010 | Chiang | ............... | G06F 1/3271 345/168 |
| 2010/0245209 A1* | 9/2010 | Miller | ............... | G06F 1/1618 345/1.3 |
| 2010/0306683 A1* | 12/2010 | Pance | ............... | G06F 3/0237 715/764 |
| 2011/0021269 A1* | 1/2011 | Wolff-Peterson | ....... | A63F 13/85 463/29 |
| 2011/0285631 A1* | 11/2011 | Imamura | ............... | G06F 1/1641 345/168 |
| 2011/0296333 A1* | 12/2011 | Bateman | ............... | G06F 3/04886 715/773 |
| 2012/0038541 A1* | 2/2012 | Song | ............... | G06F 3/1423 345/1.1 |
| 2012/0050183 A1* | 3/2012 | Lee | ............... | G06F 3/1423 345/173 |
| 2012/0120016 A1* | 5/2012 | Mittal | ............... | G06F 3/04886 345/173 |
| 2012/0307520 A1* | 12/2012 | Chen | ............... | G02B 6/0036 362/606 |
| 2013/0016040 A1* | 1/2013 | Ahn | ............... | G06F 1/1692 345/163 |
| 2013/0021262 A1* | 1/2013 | Chen | ............... | G06F 3/0488 345/173 |
| 2013/0033435 A1* | 2/2013 | Raveendran | ......... | G06F 3/0481 345/173 |
| 2013/0321329 A1* | 12/2013 | Tokutake | ............ | G06F 3/04845 345/174 |
| 2014/0176445 A1* | 6/2014 | Stonefield | ................. | G06F 3/02 345/168 |
| 2014/0346969 A1* | 11/2014 | Hinrichs | ............... | H05B 47/175 315/292 |
| 2016/0100465 A1* | 4/2016 | Prescott | ................ | A63F 13/44 345/170 |
| 2018/0285051 A1* | 10/2018 | Cawley | ............... | G06F 21/6263 |
| 2018/0321950 A1* | 11/2018 | Bikumala | ............... | G06F 9/451 |

FOREIGN PATENT DOCUMENTS

| | | |
|---|---|---|
| EP | 1914965 | 4/2008 |
| WO | 2007036890 A2 | 4/2007 |

OTHER PUBLICATIONS

European Office Action dated Jan. 7, 2022 for European Patent Application No. 18762043.0, filed Aug. 22, 2018, with English translation, 14 pages.

* cited by examiner

DEVICE AND METHOD FOR GENERATING MOVING LIGHT EFFECTS, AND SALESROOM HAVING SUCH A SYSTEM

The invention relates to a system and method for generating moving light effects, in particular for screens or monitors, on keyboards, on computer mice, on headphones or headsets, and at or on surfaces or the like. The invention further relates to a salesroom having such a system.

As well as the esthetic content of illuminating the aforementioned items, it also has an assistive function for computer game players, for example.

By comparison with the systems and methods known in the art, an object of the present invention is to provide an improved system and an improved method for generating moving light effects. In addition, an object of the invention is to specify a salesroom that is equipped with a system for generating moving light effects.

The object as regards the system is achieved by a system having the feature set of claim 1, and the object as regards the salesroom is achieved by a salesroom having the features of claim 15. Further advantageous configurations having expedient developments of the system are contained in the dependent claims.

It has a display comprising a plurality of lighting units, which is designed to emit one or more temporally changing, and thus dynamic, color patterns. This display may be part of a monitor or a presentation area in a salesroom. Further, the display may be part of a tablet PC or smartphone.

The system further comprises at least one peripheral device having a lighting arrangement that has one or more lighting units. The peripheral device may be a keyboard, a computer mouse, headphones or a headset with a microphone. Other peripheral devices are also possible, as long as they have lighting units. A control module is provided for actuating the lighting units of the display and the one or more lighting units of the peripheral device. The control module is designed to operate the one or more lighting units of the peripheral device and the lighting units of the display generating the color pattern in one-sided or mutual dependence on one another.

Thus, for a user of the system, an internally coherent overall impression of the moving lighting effects can be achieved, since each color pattern outputted or displayed on the display continues on the one or more peripheral devices by means of the lighting units present there. If continuation of the color pattern is not fully possible, at least the lighting intensity and lighting floor of the lighting units of the peripheral device are oriented to the color pattern outputted by the display. However, it should be noted that the reverse situation is also possible, where a color pattern generated on one or more peripheral devices is then continued on the display and/or the color pattern outputted on the display is influenced by the lighting arrangement of the peripheral device.

To generate the color pattern, a random generator may be provided, by means of which a random, temporally changing color pattern can be generated. Generating complex color progressions and color transitions is also possible.

However, to provide a soft transition between different colors, it has been found to be advantageous if the temporally changing color pattern brings about a non-linear progression change or pattern change.

It is further advantageous if the temporally changing color pattern is subject to temporally changing organic shaping, similarly to a lava lamp. This leads to one or more corner-free and/or edge-free color patterns being present. Corners and edges can lead to a color pattern that is agitated or perceived by the user as agitated.

Alternatively or in addition, the peripheral device may be formed as an input device, by means of which one or more input signals can be transmitted to the control module. For this purpose, the peripheral device preferably has at least one input element, for example via an input button, for triggering an input signal at the peripheral device or for causing the peripheral device to emit an input signal that is transmitted to the control module.

In this case, the control module is designed to change the temporally changing color pattern in dependence on the one or more transmitted input signals. The temporally changing pattern is changed, or continued in a changed form, both on the display and on any further peripheral devices that are present. For example, if the peripheral device is formed as a mouse, the pattern may follow the mouse cursor. Alternatively, the coloration and/or shaping of the pattern may change when the mouse button is actuated by a user. The same preferably also applies to the pattern background, which thus likewise changes its shaping.

Alternatively or in addition, a memory may be provided for storing and/or documenting input signals emitted by the one or more peripheral devices. Alternatively or in addition, an evaluation unit is thus also provided, and is designed to compare a transmitted input signal with input signals stored in the memory so as to generate an at least partial repeated color pattern using an algorithm. For this purpose, the evaluation is preferably in an at least unidirectional, more preferably in a bidirectional communicative connection with the control module. If the evaluation unit uses an adaptive algorithm, for example formed using an artificial neural network, the evaluation unit can intelligently recognize in advance what coloration, what color progressions, and in particular what repeated color pattern are to be produced. The evaluation unit thus learns from the behavior of the system. For example, a particular key on the keyboard may always light up in a particular color tone when a particular game scenario occurs.

It has further been found to be advantageous if a coloration of the temporally changing color pattern is always within a predeterminable and/or changeable color spectrum. As a result of the coloration, for example the moods provided in a game, for example of a passing patch of clouds, can also be generated in the real world. If a scene in a game specifically takes place at night, a color spectrum in the blue or dark-blue range will preferentially be selected for the coloration of the temporally changing color pattern. For sunrise or sunset, orange or yellow color tones will preferentially dominate, in such a way that a corresponding color spectrum is established. If the player is travelling through a forest in the game, the color spectrum will be in the green range. Other scenarios are naturally conceivable.

The system is preferably also configured to detect ambient conditions (for example time or time of day, date, weather etc.) with or without a sensor and to adapt the color scheme of the color pattern or pattern background to these ambient conditions. Thus, optionally with the assistance of a brightness sensor, it can be detected whether it is day or night. In this case, the lighting units are preferably operated at a higher lighting intensity at day than at night.

In an alternative embodiment, the temporally changing color pattern on the display and/or on the peripheral device is covered at least in part by one or more user operating surfaces or by a user interface. Thus, the temporally changing color pattern can also be used as a conventional desktop background.

Preferably, in the system, at least two of the peripheral devices are present, of which a first peripheral device is in the form of a keyboard and a second peripheral device is in the form of a mouse. For playing computer games as a team, however, it has been found to be advantageous if three of the peripheral devices are present in the system, of which a third peripheral device is in the form of a headset.

The object as regards the method is achieved by a method having the steps of claim 10. Advantageous configurations having expedient developments of the method are specified in the claims dependent thereon.

In this context, the lighting units of a display are actuated by a control module, and a temporally changing, in particular dynamic color pattern is outputted or displayed on the display. Further, one or more lighting units of a peripheral device are actuated by the control module. The control module operates the one or more lighting units of the peripheral device in dependence on the lighting units of the display that are producing the color pattern. Alternatively, the control module operates the lighting units of the display in dependence on the one or more lighting units of the peripheral device. By way of the method, an internally coherent, fluid design of the lighting can be generated, which assists a computer game player or gamer and optionally provides additional information concerning a temporal progression or the orientation in space.

An advantageous development of the method provides transmission or emission of an input signal by or by means of the peripheral device, the peripheral device being formed as an input device in this case. For this purpose, the peripheral device has for example an input element, which may be in the form of a knob, a button, a scroll wheel or the like. The input signal emitted by the peripheral device is transmitted to the control module, which receives the input signal transmitted by the peripheral device and which then changes the temporally changing color pattern in dependence on the received input signal. The player or the user of the method thus receives feedback information by way of an input signal outputted by the peripheral device, for example as a result of pressing a key on a keyboard or moving the scroll wheel of the mouse. In this way, feedback is provided for the user.

Alternatively or in addition, the input signals received by the control module are compared with input signals stored in a memory. For this purpose, an evaluation unit is used, which preferably forms part of the control module but may also be present as a separate processor. Further, an at least partial repeating color pattern is generated and outputted or displayed on the display and on the lighting units of the peripheral device that are correlated with what is displayed on the display. In this case too, the evaluation unit may be an adaptive system, in other words an artificial intelligence (AI). The evaluation unit can learn from player behavior and indicate an imminent situation in advance by way of corresponding coloration of the temporally changing color pattern. For example, by way of the system, frequently actuated keys are lit more intensively or with a signal color, in such a way that they are found more rapidly by the player. To generate different game moods, the temporally changing color pattern may be displayed or outputted in a coloration within a predeterminable and/or changeable color spectrum. Preferably, the color spectrum also changes upon receipt of an input signal emitted by the peripheral devices and received by the evaluation unit or control module.

The advantages and configurations described for the system and method also apply to a salesroom, which is in particular formed from at least one display, formed as a television or as a tabletop, and one or more peripheral devices. In this case, the coloration and shaping of the temporally changing color pattern gives an improved shopping experience.

Thus, overall, the color pattern or the displayed colors on the display and at the lighting arrangements of the one or more peripheral devices are non-static and in particular non-linear. The shaping of the at least one color pattern is preferably likewise temporally changeable, and further preferably involves edge-free and corner-free shapes, thus in other words dynamic, organic shapes without corners.

In the following, the invention is described in greater detail by way of embodiments that are shown in the drawings, in which.

Figure 1:
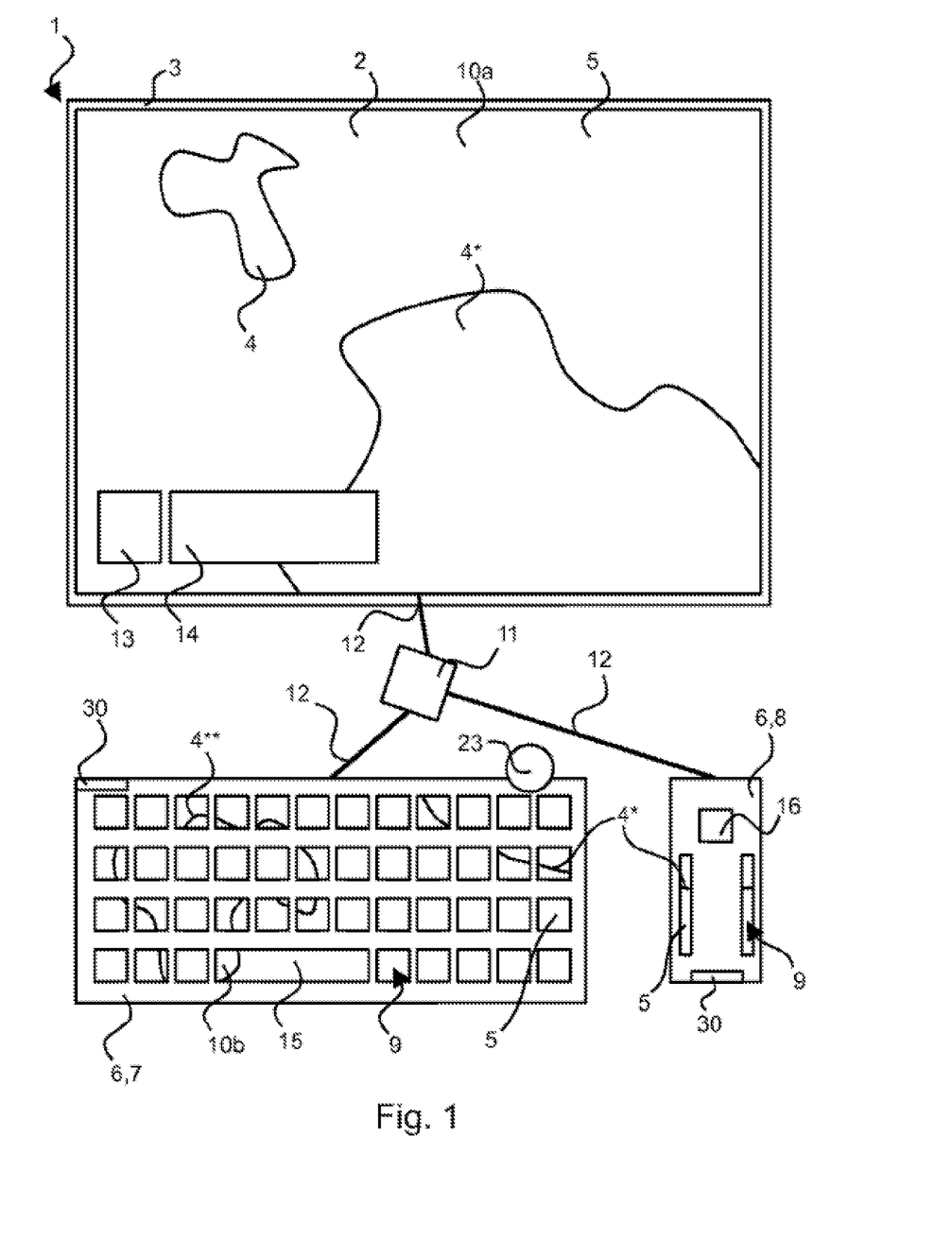
FIG. 1 is a schematic drawing of the system comprising two peripheral devices in the form of a keyboard and mouse.

FIG. 1 shows a system 1 for generating moving light effects. Therein, a display 2 comprising a plurality of lighting units 10*a* is provided on a screen 3 or monitor that is designed to output one or more temporally changing, dynamic color patterns 4, 4*. The color patterns 4, 4* may also be subject to a color progression. A pattern background 5, which may also be subjected to a color progression, may also be displayed by the display 2.

Moreover, the system 1 shown comprises a plurality of peripheral devices 6, in the present case exactly two, in the form of a keyboard 7 and in the form of a mouse 8. Each peripheral device 6 comprises a lighting arrangement 9, which in the embodiment shown has a plurality of lighting units 10*b*.

The system 1 further comprises a control module 11, which is formed to actuate the lighting units 10*a* of the display 2 and the lighting units 10*b* of the peripheral devices 6. The connections 12 between the control module 11 and the display 2 or the lighting units 10*b* of the peripheral devices 6 may be formed wired or wireless (for example Bluetooth, WLAN, NFC, NFC etc.). The control module 11 is designed to operate the lighting units 10*b* of the peripheral device 6 and the lighting units 10*a* of the display 2 generating the color pattern 4, 4* in mutual dependence on one another.

Therefore, in the embodiment shown, the color pattern 4* of the lower right corner of the display 2 continues in the upper right corner of the keyboard 7. Moreover, this color pattern 4* further continues in the upper region of the lighting arrangement 9 of the mouse 8.

However, a temporally changing color pattern 4 may also be displayed in isolation on a peripheral device 6, as can be seen on the left side of the keyboard 7. All color patterns 4, 4*, 4** are temporally changing and subject to organic shaping. They may disappear completely and appear or be generated again at another point. So as to bring about organic coloration or shaping, in other words to generate a temporally changing color pattern 4, 4*, 4**, at the keyboard 7, single-key LEDs are preferably actuable by the control module 11**.

Preferably, independent applications can be implemented at the individual peripheral devices 6, in such a way that the control module 11 is formed as a middleware, in other words as a distribution platform for actuating the individual applications at the individual peripheral devices 6. In other words, a distributed system 1 for generating moving light effects is present. Alternatively or in addition, an independent processor 30 (for example a microprocessor), via which the control module 11 can actuate the LEDs 10*b* of the peripheral devices 6, may be assigned to each peripheral device 6. The display 2 is also in a communicative connection with a processor, which preferably has a memory in which a real-time operating system (RTOS) and one or more applications are stored.

Further, on the display 2, a user operating surface 13 or an icon can be seen, in such a way that the temporally changing color pattern 4, 4*, 4 can for example be formed as a desktop background. The color pattern 4, 4*, 4** and the pattern background 5 do not overlie the user operating surface 13 or the user display field 14** that is likewise shown.

In the embodiment shown, each of the peripheral devices 6 is formed as an input device, by means of which one or more input signals can be transmitted to the control module 11. The control module 11 is therefore additionally designed to change the temporally changing color pattern 4, 4*, 4 as a function of the transmitted input signals. For example, a color change takes place as a result of a key 15 on the keyboard 7 being actuated or a mouse button 16 on the mouse 8** being actuated.

The mouse 8 shown may comprise a lighting arrangement 9 that provides RGBA multi-zone lighting by way of the lighting units 10*b* thereof. Each lighting zone is preferably configurable independently of any other. The mouse 8 preferably also has an optical (owl-eye) sensor having a resolution of up to 12,000 dpi (dots per inch). Moreover, a 4D scroll wheel may be provided. In addition, in the region of the thumb, two or more, in particular three buttons for actuation by the user may be provided. Preferably, the pick-up flight behavior of the mouse 8 can be configured.

The keyboard 7 may be formed as a gaming keyboard comprising a lighting arrangement 9, which has a membrane having an RGB coloration. Moreover, the shaping of the keys 15 may have been adapted or may become adapted so as to bring about a more pleasant feel during gaming and during typing. In addition, flat macro keys may be provided, so as not to interfere on the left side and so as to provide increased user-friendliness. In addition, a control wheel 23 may be provided, which preferably allows stepped actuation. In addition, individual rubber dome paths for macro keys, media keys and main keys can be selected.

The keyboard 7 alternatively or additionally has a single-key lighting arrangement 9 with single-key actuation by a processor 30 and/or by the control module 11. Moreover, the keys 15 may—optionally additionally—be mechanical keys, which are in particular kept dust-free. Alternatively or in addition, the keyboard 7 has a modular platform design.

The keyboard 7 may further have an audio input and an audio output, and optionally a graphics input and/or a graphics output. All plugs can advantageously be detachably connected to the keyboard 7. The keyboard 7 may have a dedicated microprocessor. The individual keys may be formed in a platform manner. Preferably, an additional holder can be connected to the keyboard 7.

A memory (not shown in greater detail) for storing and/or documenting input signals may optionally additionally be assigned to the control module 11. Moreover, an evaluation unit (processor 30 or microprocessor) may be provided, which is designed to compare a transmitted input signal with input signals stored in the memory. As a result, said unit can generate an at least partial repeating color pattern by means of a preferably adaptive algorithm and output said pattern at the display 2 and at the lighting arrangements 9 of the peripheral devices 6.

Figure 2:
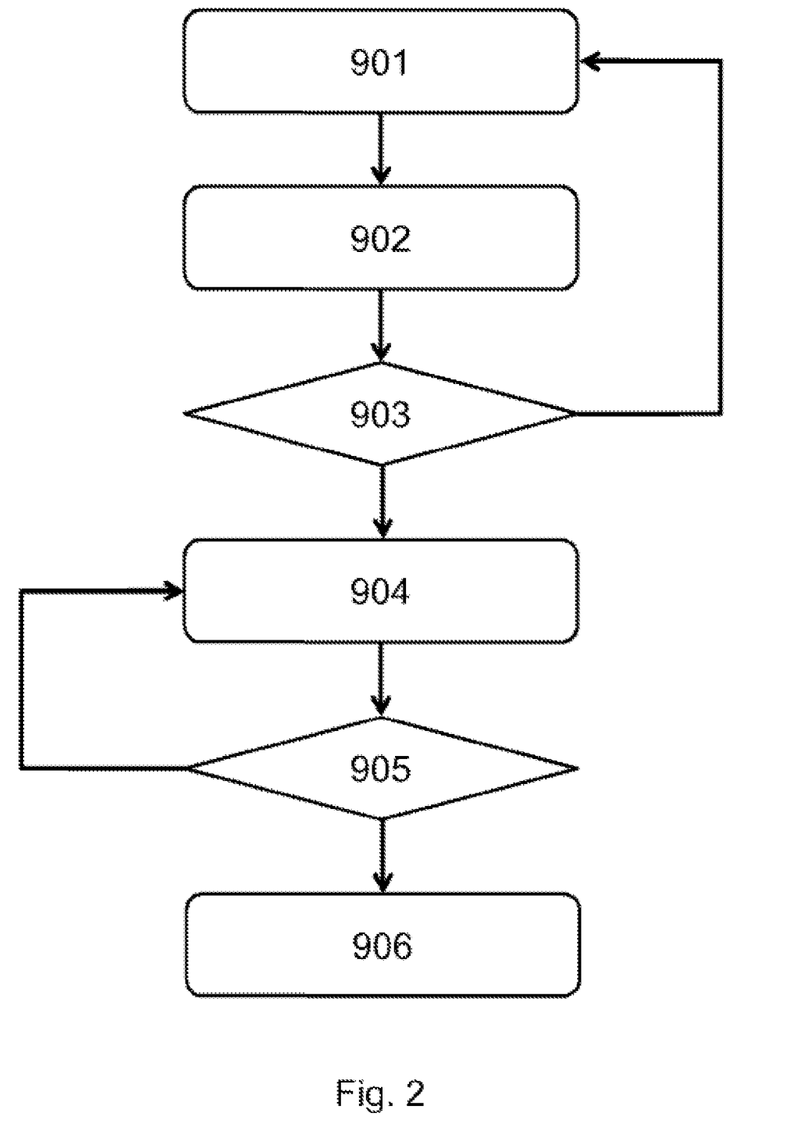
FIG. 2 is a schematic drawing of a method for generating moving light effects.

By way of FIG. 2, in the following a method for producing moving light effects is to be described by way of example. Initially, the lighting units 10*a* of the display 2 are actuated by the control module 11, causing a temporally changing, dynamic color pattern 4, 4*, 4 to be outputted on the display 2 (step 901). Subsequently, the lighting units 10***b* of the peripheral device 6 are actuated by the control module 11 and operated in dependence on the lighting units 10*a* of the display 2 that generate the color pattern 4, 4* (step 902).

Since the peripheral devices 6 are formed as input devices, an input signal can be sent to the control module 11, for example by way of a keypress. As a result, there is a query or test as to whether an input signal has been received by the control module 11 (step 903). If no input signal has been received by the control module 11, the method starts from scratch. Otherwise, the temporally changing color pattern 4, 4*, 4 is changed in dependence on the received input signal (step 904**).

The received input signal may be supplied to a memory for storing input signals. Therefore, it is possible for the control module 11 or an evaluation unit in a communicative connection with the control module 11 to test whether a received input signal corresponds to an input signal stored in the memory (step 905). If this is not the case, no change occurs. However, if the received input signal does correspond to an input signal stored in the memory, a repeating color pattern is outputted on the display 2 and on the lighting units 10*b* of the peripheral devices 6 that are correlated with what is displayed on the display 2 (step 906).

Figure 3:
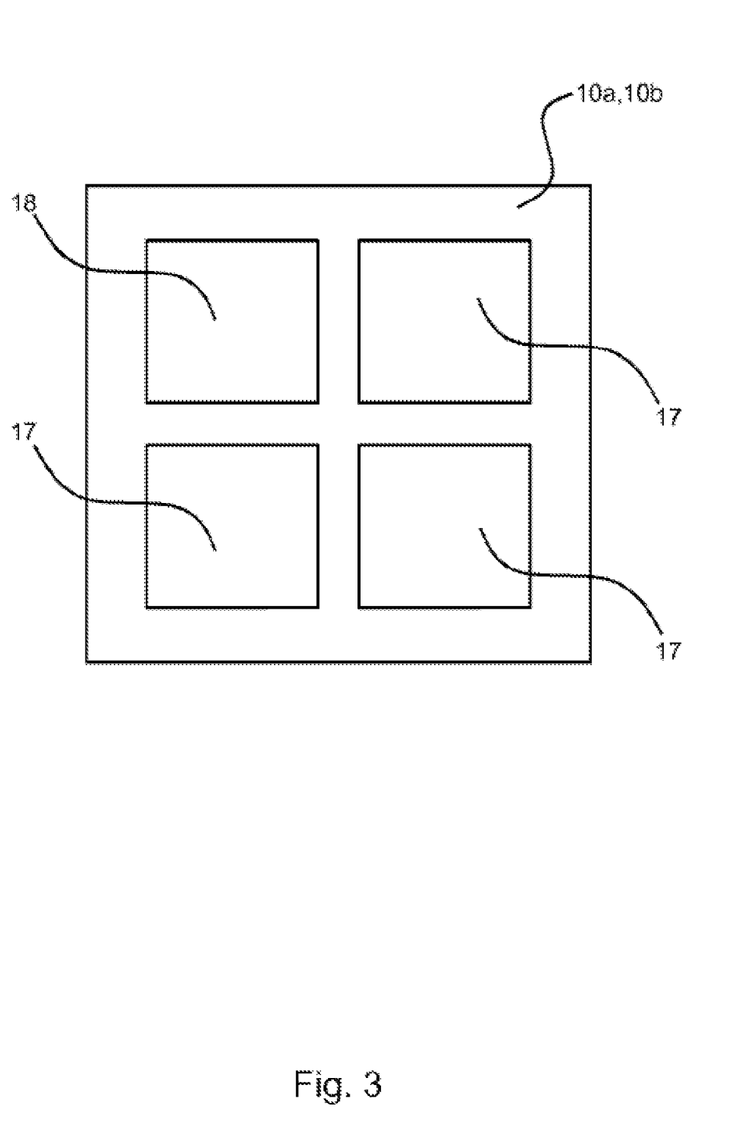
FIG. 3 is a schematic drawing of a lighting units.

FIG. 3 shows by way of example an individual lighting unit 10*a*, 10*b* comprising a plurality of sub-units 17. The sub-units 17 are formed as single-color LEDs, but preferably as OLEDs. The use of OLEDs has the advantage that a lower construction height can be achieved than with the use of conventional LEDs. Further, an AMOLED (active-matrix organic light-emitting diode) may be used, and may be formed as a film, in such a way that complex shapings for the display 2 or for the lighting arrangement 9 of the peripheral devices 6 are possible. The sub-units 17 may for example shine in the colors red, green and blue (RGB color space), preferably at a different intensity. Moreover, a fourth, alpha channel 18 may be provided so as to enable lighting in the RGBA color space. The fourth, alpha channel 18 serves to adjust opacity. As a result, complex color transitions and color progressions can be implemented.

Figure 4:
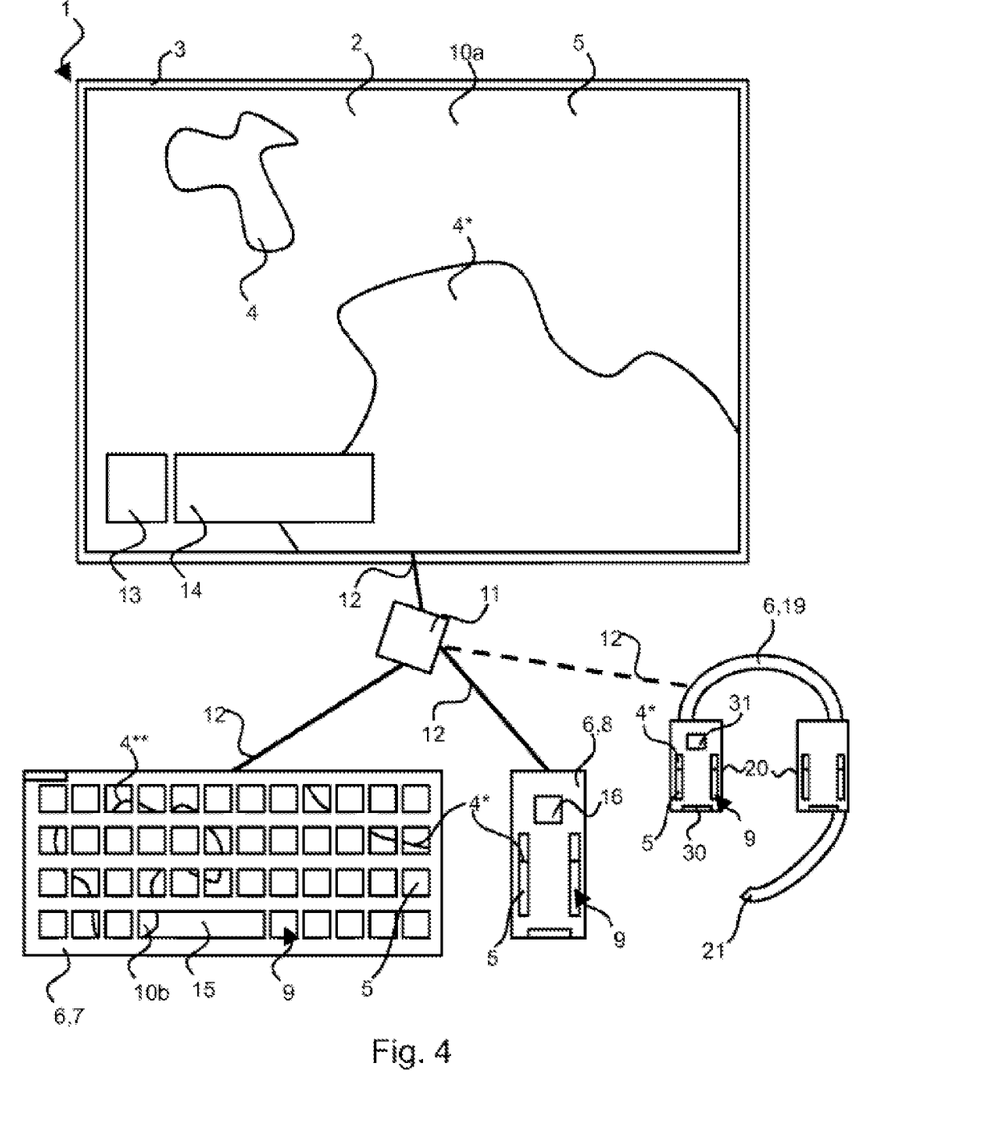
FIG. 4 is a schematic drawing of a system comprising three peripheral devices in the form of a keyboard, a mouse and a headset.

FIG. 4 shows a further system 1 for generating moving lighting effects, in which—unlike in the system 1 of FIG. 1—three of the peripheral devices 6 are provided. As well as a keyboard 7 and a mouse 8, a headset 19 is additionally connected to the control module 11. The peripheral device 6 formed as a headset 19 is configured as an input and output device. Sounds and notes can be outputted by way of the loudspeaker 20 of the headset 19, while sounds and notes can be inputted by way of the microphone 21. However, the headset 19 too may have one or more keys 31, which are to be understood as input elements and upon actuation of which an input signal is transmitted to the control module 11.

An intelligent or adaptive lighting system is present, this also being referred to as "living light." Non-linear, organic shapings and color progressions are shown. Shapes and colors can be displayed in a device-universal manner. Although the lighting arrangement 9 of the headset 19 is not located directly in the field of vision of the user, the lighting from the headset 19 can be perceived. By way of said lighting, in particular for example illumination or lighting of the background or environment in the room or of the room can be achieved.

The peripheral device 6 formed as a headset 19 may be a 7.1 high-resolution RGB gaming headset with an integrated 7.1 soundcard. It may comprise a passive noise suppressor and a shape-memory foam for the earpieces, so as to provide a comfortable feel even during longer gaming sessions. The headset 19 may have steel sliders for size adjustment, and is preferably formed with a weight of between 150 grams and 350 grams, preferably of between 250 grams and 300 grams, more preferably of 275 grams. In addition, a real-voice microphone may be provided.

The headset 19 is suitable for various applications. It may be detachably connected either to an inline microphone for mobile applications or to a plug with a microphone arm for example for the PC. It is distinguished in particular by an aerodynamic design, in particular by a low weight for long-term wearing and in particular by a very high audio quality.

The headset 19 may also be formed with rotatable suspension of the earpieces, in such a way that a perfect fit is provided for all head sizes. The suspension can preferably be twisted through up to 95 degrees.

Figure 5:
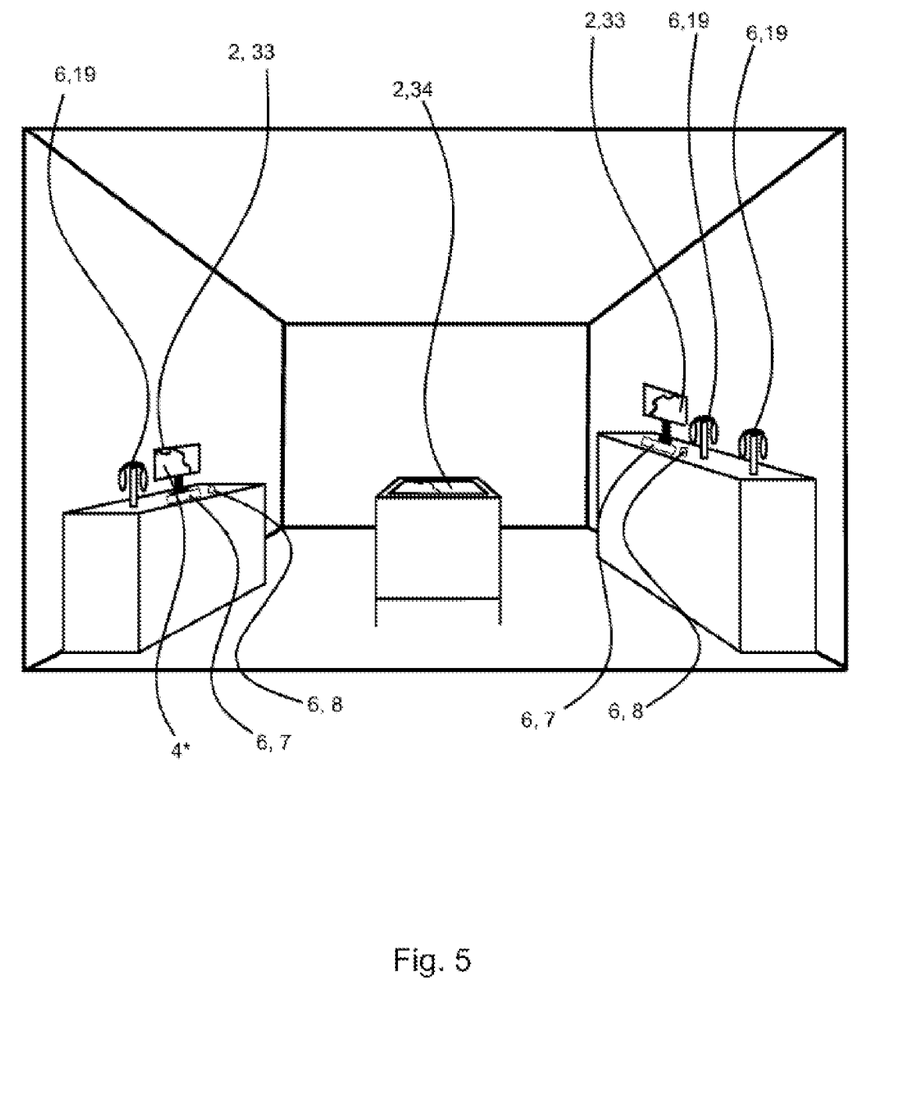
FIG. 5 is a schematic drawing of a salesroom comprising a system for generating moving light effects.

Finally, FIG. 5 further shows a salesroom of a retail outlet, which has a display 2 formed as an (OLED) television 33 or as an (OLED) tabletop 34, said display being operated in correlation with the peripheral devices 6 in the form of headphones, headsets 19, keyboards 7, mice 8 or the like.

LIST OF REFERENCE NUMERALS

1 System
2 Display
3 Screen
4 Color pattern (device-universal representation)
4\* Color pattern (representation on display)
**4\*\*** Color pattern (representation on peripheral device)
5 Pattern background
6 Peripheral devices
7 Keyboard
8 Mouse
9 Lighting arrangement
10a Lighting units (display)
10b Lighting unit (peripheral device)
11 Control module
12 Connections
13 User operating surface
14 User display field
15 Key (keyboard)
16 Mouse button
17 Sub-unit
18 Fourth, alpha channel
19 Headset
20 Loudspeaker
21 Microphone
23 Control wheel
30 Processor
31 Button (headset)
33 Television
34 Tabletop

The invention claimed is:

1. A system for generating moving light effects, comprising:
a first peripheral device comprising a screen having a plurality of first lighting units, the plurality of first lighting units configured to output one or more temporally changing color patterns;
a second peripheral device comprising a lighting arrangement having one or more second lighting units, wherein the second peripheral device is a mechanical keyboard, a headset, or a mouse; and
a first processor configured to actuate the plurality of first lighting units of the screen and the one or more second lighting units of the second peripheral device to generate a temporally changing color pattern such that a first portion of the generated temporally changing color pattern is displayed on the screen, and at the same time, a second portion of the generated temporally changing color pattern is displayed on the second peripheral device, wherein the first portion of the generated temporally changing color pattern is a different portion of the generated temporally changing color pattern from the second portion of the generated temporally changing color pattern.

2. The system according to claim 1, wherein the second peripheral device is configured as an input device, the second peripheral device to transmit one or more input signals to the first processor, and the first processor configured to change the one or more temporally changing color patterns as a function of the transmitted input signals.

3. The system according to claim 2, further comprising:
a memory configured to store and/or to document the input signals, and
a second processor configured to compare a transmitted input signal with the input signals stored in the memory so as to generate an at least partial repeated color pattern using an algorithm.

4. The system according to claim 3, wherein the second processor is further configured to use an adaptive algorithm formed via an artificial neuronal network, the adaptive algorithm generating the at least partial repeated color pattern.

5. The system according to claim 4, wherein a coloration of the one or more temporally changing color patterns is within a predeterminable and/or changeable color spectrum.

6. The system according to claim 1, further comprising:
a sensor to detect ambient conditions, the ambient conditions comprising a time, a time of day, a date, or weather; and
the first processor is configured to generate the temporally changing color pattern in dependence on the detected ambient conditions.

7. The system according to claim 1, wherein the temporally changing color pattern displayed on the screen is covered at least in part by one or more user operating surfaces or by a user interface.

8. A method for generating moving light effects, comprising:
actuating, via a first processor, first lighting units of a screen of a first peripheral device and one or more second lighting units of a second peripheral device, wherein the second peripheral device is a mechanical keyboard, a headset, or a mouse;
outputting, via the first processor, a temporally changing color pattern such that a first portion of the generated temporally changing color pattern is displayed on the screen, and at the same time, a second portion of the generated temporally changing color pattern is displayed on the second peripheral device, wherein the first portion of the generated temporally changing color pattern is a different portion of the generated temporally changing color pattern from the second portion of the generated temporally changing color pattern.

9. The method according to claim 8, further comprising:
transmitting an input signal by way of the second peripheral device;
receiving the input signal by way of the first processor; and
changing the temporally changing color pattern in dependence on the received input signal.

10. The method according to claim 9, further comprising:
comparing the received input signal with input signals stored in a memory by way of a second processor; and
generating and outputting the temporally changing color pattern as an at least partial repeating color pattern based on the comparing.

11. The method according to claim 8, further comprising:
displaying the temporally changing color pattern in a coloration within a predeterminable and/or changeable color spectrum.

12. The method according to claim 11, further comprising:
changing, via the first processor, the color spectrum to a different color spectrum upon receipt of an input signal.

13. A system for generating moving light effects in a salesroom of a retail outlet, comprising:
a first peripheral device comprising a screen having a plurality of first lighting units, the first plurality of lighting units configured to output one or more temporally changing color patterns, wherein the device comprises a television or a tabletop;
a second peripheral device in the salesroom comprising a lighting arrangement having one or more second lighting units, the one or more second lighting units configured to output the one or more temporally changing color patterns, wherein the second peripheral device comprises a headset, headphones, a mechanical keyboard, or a mouse; and
a first processor configured to actuate the plurality of first lighting units of the first peripheral device and the one or more second lighting units of the second peripheral device to generate the temporally changing color pattern at a first point in time such that a first portion of the generated temporally changing color pattern is displayed on the screen, and at the same time, a second portion of the generated temporally changing color pattern is displayed on the second peripheral device, wherein the first portion of the generated temporally changing color pattern is a different portion of the generated temporally changing color pattern from the second portion of the generated temporally changing color pattern.

14. The system according to claim 13, wherein the second peripheral device is configured as an input device, the second peripheral device to transmit one or more input signals to the first processor, and the first processor configured to change the one or more temporally changing color patterns as a function of the transmitted input signals.

15. The system according to claim 14, further comprising:
a memory configured to store and/or to document the input signals, and
a second processor configured to compare a transmitted input signal with the input signals stored in the memory so as to generate an at least partial repeated color pattern using an algorithm.

16. The system according to claim 15, wherein the second processor is further configured to use an adaptive algorithm formed via an artificial neuronal network, the adaptive algorithm generating the at least partial repeated color pattern.

17. The system according to claim 16, wherein a coloration of the one or more temporally changing color patterns is within a predeterminable and/or changeable color spectrum.

18. The system according to claim 13, further comprising:
a sensor to detect ambient conditions, the ambient conditions comprising a time, a time of day, a date, or weather; and
the first processor is configured to generate the temporally changing color pattern in dependence on the detected ambient conditions.

19. The system according to claim 13, wherein the temporally changing color pattern displayed on the screen is covered at least in part by one or more user operating surfaces or by a user interface.

* * * * *